(12) United States Patent
McMasters

(10) Patent No.: US 7,007,481 B2
(45) Date of Patent: Mar. 7, 2006

(54) THICK COATED COMBUSTOR LINER

(75) Inventor: Marie Ann McMasters, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/659,145

(22) Filed: Sep. 10, 2003

(65) Prior Publication Data

US 2005/0050896 A1 Mar. 10, 2005

(51) Int. Cl.
*F02C 3/00* (2006.01)
*F23R 3/06* (2006.01)

(52) U.S. Cl. .............................. 60/752; 60/753; 60/757
(58) Field of Classification Search ........... 60/752–760
See application file for complete search history.

(56) References Cited

U.S. PATENT DOCUMENTS

| | | | |
|---|---|---|---|
| 3,845,620 A | 11/1974 | Kenworthy | |
| 4,485,630 A | 12/1984 | Kenworthy | |
| 4,655,044 A * | 4/1987 | Dierberger et al. | 60/753 |
| 5,073,433 A | 12/1991 | Taylor | |
| 5,083,422 A * | 1/1992 | Vogt | 60/757 |
| 5,209,067 A * | 5/1993 | Barbier et al. | 60/757 |
| 5,279,127 A | 1/1994 | Napoli | |
| 5,528,904 A | 6/1996 | Jones et al. | |
| 5,941,686 A | 8/1999 | Gupta et al. | |
| 6,250,082 B1 * | 6/2001 | Hagle et al. | 60/753 |
| 6,383,602 B1 | 5/2002 | Fric et al. | |
| 6,438,958 B1 * | 8/2002 | McCaffrey et al. | 60/752 |
| 6,511,762 B1 | 1/2003 | Lee et al. | |
| 6,655,146 B1 * | 12/2003 | Kutter et al. | 60/757 |
| 6,675,582 B1 * | 1/2004 | Monty et al. | 60/752 |
| 2002/0178728 A1 | 12/2002 | McCaffrey et al. | |
| 2003/0200752 A1 | 10/2003 | Moertle et al. | |

FOREIGN PATENT DOCUMENTS

JP 60-238619 11/1985

OTHER PUBLICATIONS

GE Aircraft Engines, Combustor, in production more than one year before Sep. 1, 2003.

* cited by examiner

*Primary Examiner*—Ted Kim
(74) *Attorney, Agent, or Firm*—William S. Andes; Francis L. Conte

(57) ABSTRACT

A combustor liner includes panels joined together at a cooling nugget including a bridge and a lip extending therefrom. The lip defines a slot terminating in an outlet. Thermal barrier coating covers inboard surfaces of the panels and lip with a nominal thickness. The lip has a distal end at the slot outlet which is spaced from the coating aft of the slot less than about the coating nominal thickness.

22 Claims, 4 Drawing Sheets

THICK COATED COMBUSTOR LINER

BACKGROUND OF THE INVENTION

The present invention relates generally to gas turbine engines, and, more specifically, to combustor liners therein.

In a gas turbine engine air is pressurized in a compressor and mixed with fuel and burned in a combustor. The combustion gases are channeled through a high pressure turbine which extracts energy therefrom for powering the compressor. A low pressure turbine follows the high pressure turbine for extracting additional energy from the gases for powering an upstream fan in a typical aircraft turbofan gas turbine engine application. In marine and industrial applications, the low pressure turbine instead powers an output shaft.

A typical combustor includes radially outer and inner liners joined together by an annular dome at upstream ends thereof for defining radially therebetween an annular combustion chamber. The dome includes carburetors having corresponding fuel injectors and air swirlers that introduce corresponding mixtures of fuel and air which are ignited for producing the combustion gases in the combustion chamber.

The efficiency of the engine is directly related to the temperature of the combustion gases which temperature is suitably limited for achieving a suitable life of the combustor and hot components downstream therefrom. State-of-the-art high temperature capability superalloy metals are common for modern combustor liners, and are typically protected from the hot combustion gases by having the inboard surfaces thereof covered by a thermal barrier coating (TBC). Conventional thermal barrier coatings are ceramic materials which provide a thermal insulator for exposed inboard surfaces of the combustor which directly face the hot combustion gases.

The combustor liners are further cooled by pressurized air supplied by the compressor. Various cooling configurations are provided for the combustor liners which typically effect film cooling along the inboard surfaces thereof over the thermal barrier coating.

In one typical combustor design, cooling nuggets or rings join together annular liner panels for the introduction of the film cooling air along the full circumference of the liner. A typical cooling nugget includes a radial bridge which joins the aft end of a forward panel to the forward end of the next, or aft panel. A lip extends axially downstream or aft from the aft end of the forward panel and overhangs the forward or upstream end of the next panel to define a cooling slot that extends circumferentially around the liner.

The cooling nugget includes a row of aperture inlets which receive pressurized air from the compressor. The cooling air is channeled through the nugget slots and out an annular outlet at the aft end thereof.

The thermal barrier coating is applied to the liner after fabrication thereof. The multiple panels are firstly joined axially end to end with corresponding cooling nuggets therebetween. The thermal barrier coating is conventionally sprayed over the inboard surface of the combustor liner in a relatively thin and uniform thickness of about 0.4 mm for example. Since the nugget lip overhangs the next adjacent or aft panel, the inboard surface of the lip itself is covered with the thermal barrier coating, but the inside of the slot itself is protected by the lip and is not covered by the thermal barrier coating.

However, the thermal barrier coating is substantially continuous from panel to panel along the inboard surface thereof facing the combustion gases, and the cooling air is introduced through the cooling nuggets themselves which further protects the cooling nuggets from the hot combustion gases. The cooling air discharged from the nuggets flows downstream along the thermal barrier coating on the inboard surfaces of the panels for providing a continuous cooling air film which thermally insulates the combustor liner from the hot combustion gases, and cooperates with the thermal barrier coating for providing enhanced protection of the superalloy substrate metal of the liners.

Although engine efficiency may be increased by increasing the temperature of the combustion gases, the ability to cool the combustor liners with a fixed flowrate of air is limited. Furthermore, it desired to decrease the available cooling air provided to the combustor liners for lowering NOx exhaust emissions.

Although it is possible to increase the thickness of conventional thermal barrier coatings, such thicker coatings can obstruct the proper performance of the cooling nuggets and reduce their cooling effectiveness. For example, the inlet apertures of the cooling nuggets are typically sized to meter or control the flowrate of cooling air channeled through the cooling nuggets. The slot outlet is suitably larger in flow area to ensure unobstructed discharge of the cooling air from the nuggets.

Since the size of the cooling nuggets is preferably limited for limiting size and weight of the combustor, the introduction of thicker thermal barrier coating on the liner necessarily obstructs flow discharge from the nuggets. Without the introduction of such a uniformly thick thermal barrier coating on a combustor liner, the combustor liner will not be uniformly protected from the hot combustion gases.

Accordingly, it is desired to provide an improved combustor liner having thicker thermal barrier coating thereon for enjoying the enhanced thermal protection thereof without obstructing performance of the cooling nuggets.

BRIEF DESCRIPTION OF THE INVENTION

A combustor liner includes panels joined together at a cooling nugget including a bridge and a lip extending therefrom. The lip defines a slot terminating in an outlet. Thermal barrier coating covers inboard surfaces of the panels and lip with a nominal thickness. The lip has a distal end at the slot outlet which is spaced from the coating aft of the slot less than about the coating nominal thickness.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
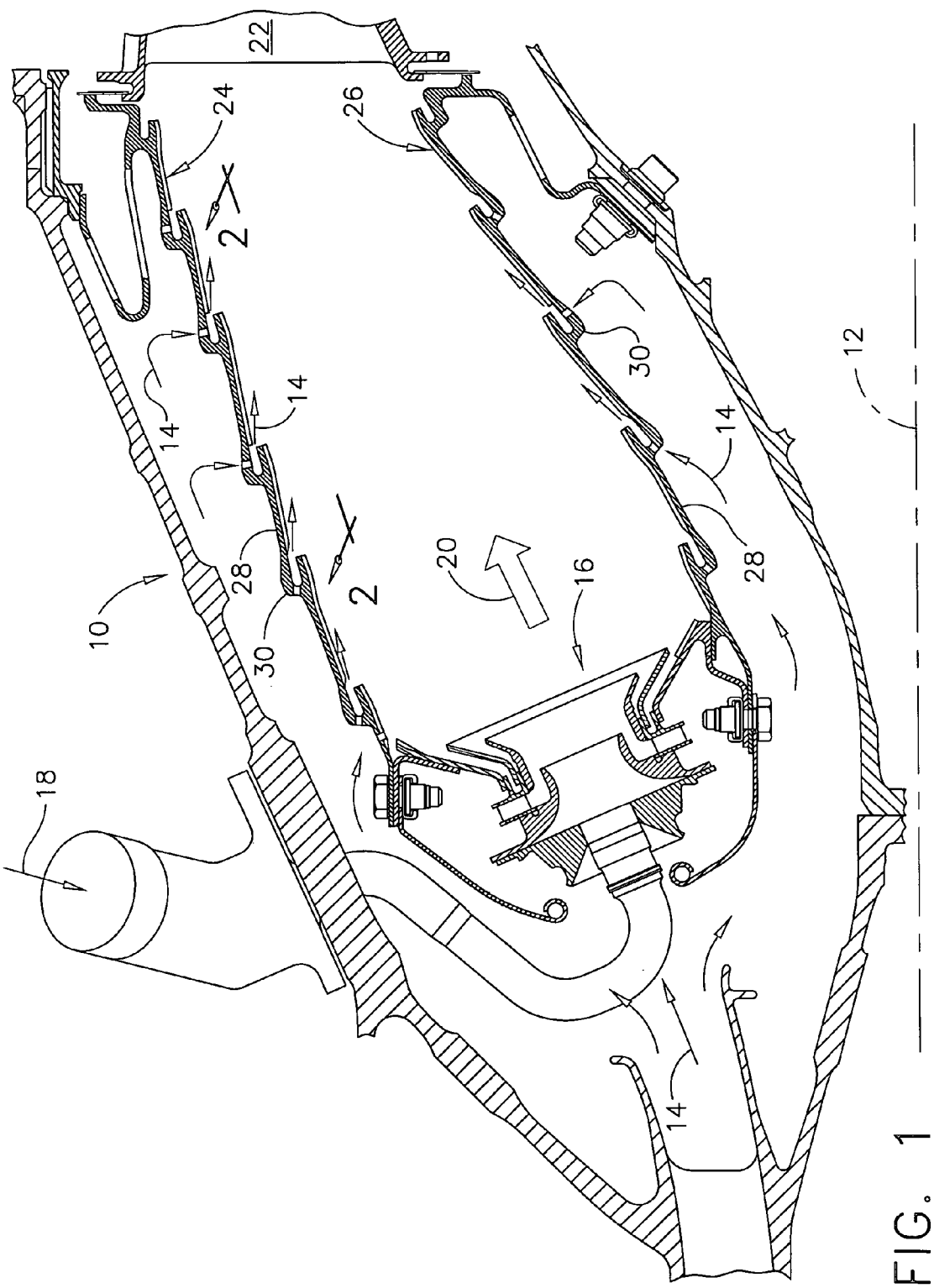
FIG. 1 is an axial sectional view of a portion of an exemplary annular combustor in a gas turbine engine.

Illustrated in FIG. 1 is an annular combustor 10 which is axisymmetrical about a longitudinal or axial centerline axis 12. The combustor is suitably mounted in a gas turbine engine having a multistage axial compressor (not shown) configured for pressurizing air 14 during operation. A row of carburetors 16 introduces fuel 18 into the combustor which is ignited for generating hot combustion gases 20 that flow downstream therethrough.

A turbine nozzle 22 of a high pressure turbine is disposed at the outlet end of the combustor for receiving the combustion gases, which are redirected through a row of high pressure turbine rotor blades (not shown) that rotate a disk and shaft for powering the upstream compressor. A low pressure turbine (not shown) is typically used for extracting additional energy for powering an upstream fan in a typical turbofan aircraft gas turbine engine application, or an output shaft in a typical marine and industrial application.

The exemplary combustor 10 illustrated in FIG. 1 includes an annular, radially outer liner 24, and an annular radially inner liner 26 spaced radially inwardly therefrom for defining an annular combustion chamber therebetween through which the combustion gases 20 flow. The upstream ends of the two liners 24,26 are joined together by annular dome in which the carburetors 16 are suitably mounted.

The two liners 24,26 have inboard surfaces, concave and convex respectively, which directly face the combustion gases 20, and are similarly configured. Accordingly, the following description of the outer liner 24 applies equally as well to the inner liner 26 recognizing their opposite radially outer and inner locations relative to the combustion chamber which they define.

Figure 2:
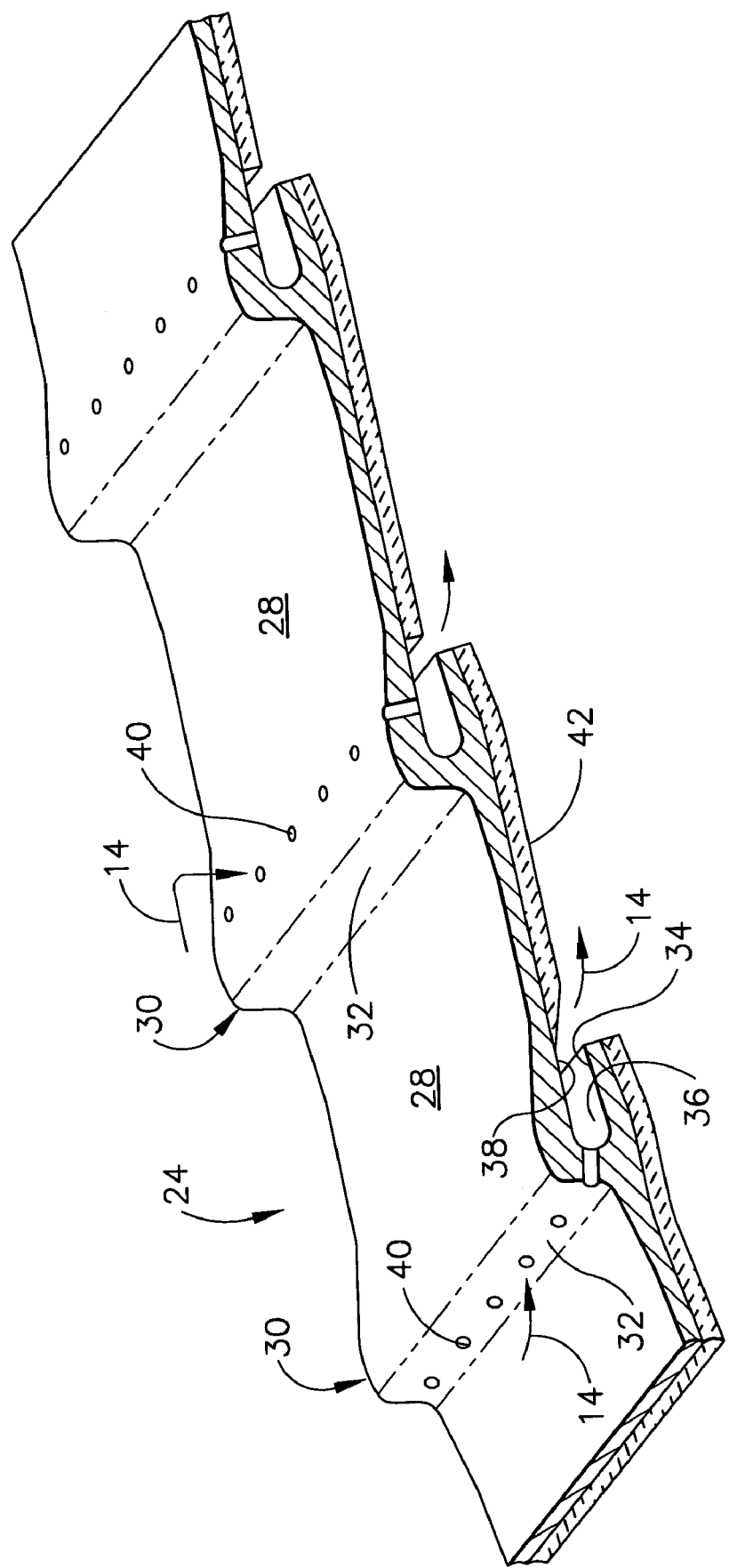
FIG. 2 is an isometric, axial sectional view of a portion of the outer combustor liner illustrated in FIG. 1 and taken generally along line 2—2.

A portion of the outer liner 24 is illustrated in more detail in FIG. 2 and is also representative of the inner liner 26 illustrated in FIG. 1, except being inverted relative thereto. The liners each include a plurality of annular segments or ring panels 28 axially joined together at integral cooling nuggets 30. The individual panels 28 are thin cylindrical or conical rings conventionally configured for the particular combustor design. The cooling nuggets 30 themselves are locally enlarged regions at which the axially adjacent panels 28 are integrally joined together for introducing the cooling air 14 received from the compressor as film cooling air along the inboard surfaces of the two liners 24,26 bounding the hot combustion gases.

As shown in FIG. 2, each cooling nugget 30 includes a radially extending bridge 32 integrally joining a downstream or aft end of a forward one of the panels to an upstream or forward end of the next adjacent downstream or aft panel. The panels 28 are conventional and joined axially end to end, with any two adjoining panels being described herein as forward and aft panels which repeat in turn from the upstream forward end of the combustor to the downstream aft end of the combustor.

An axial lip 34 extends aft from the distal end of the forward panel at the bridge and is spaced inboard from the proximal end of the next or aft panel to define radially therebetween a slot 36 having an outlet 38 at the aft end thereof.

Figure 3:
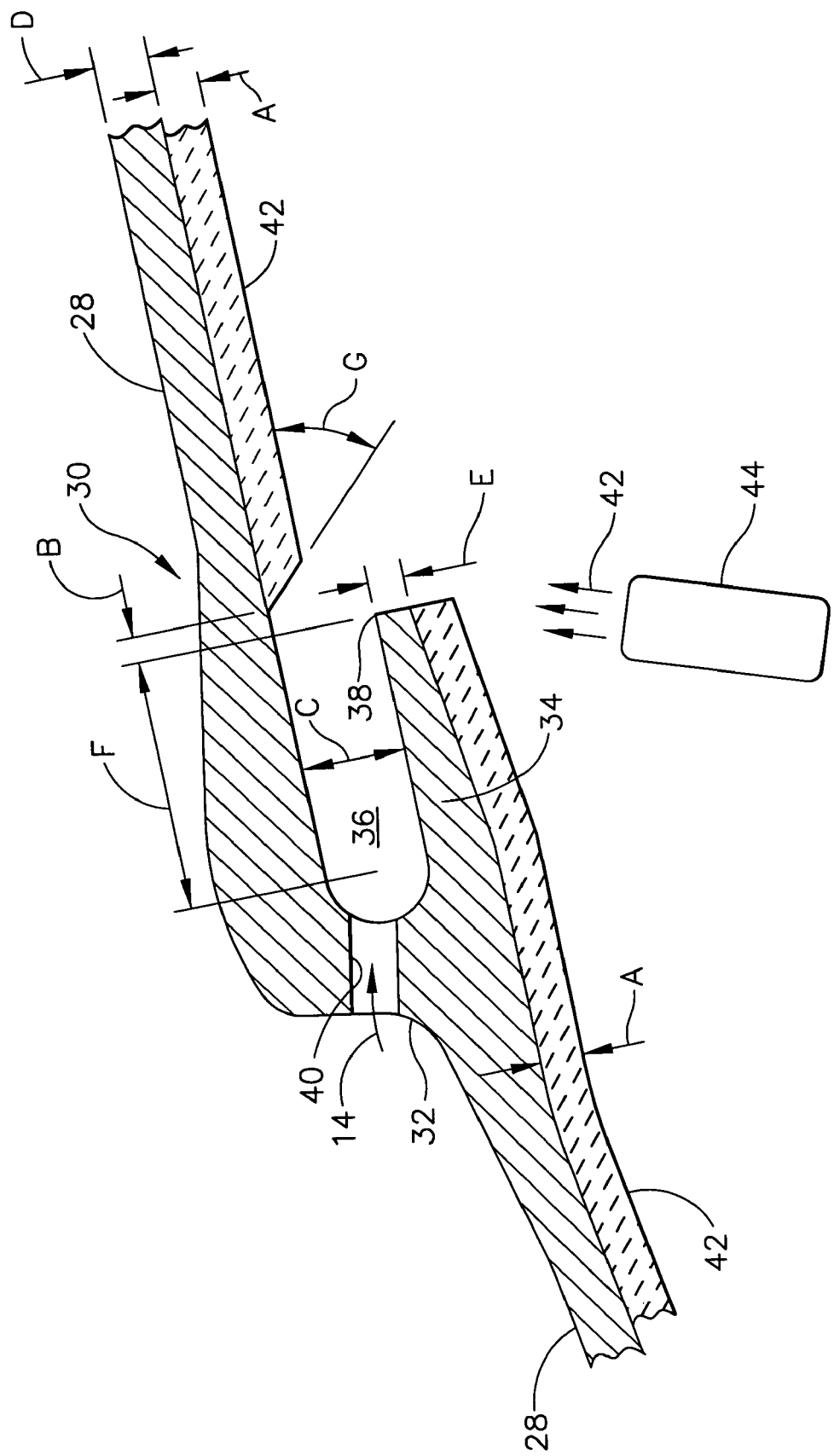
FIG. 3 is an enlarged axial sectional view of one of the cooling nuggets illustrated in FIG. 2 in accordance with one embodiment.
Figure 4:
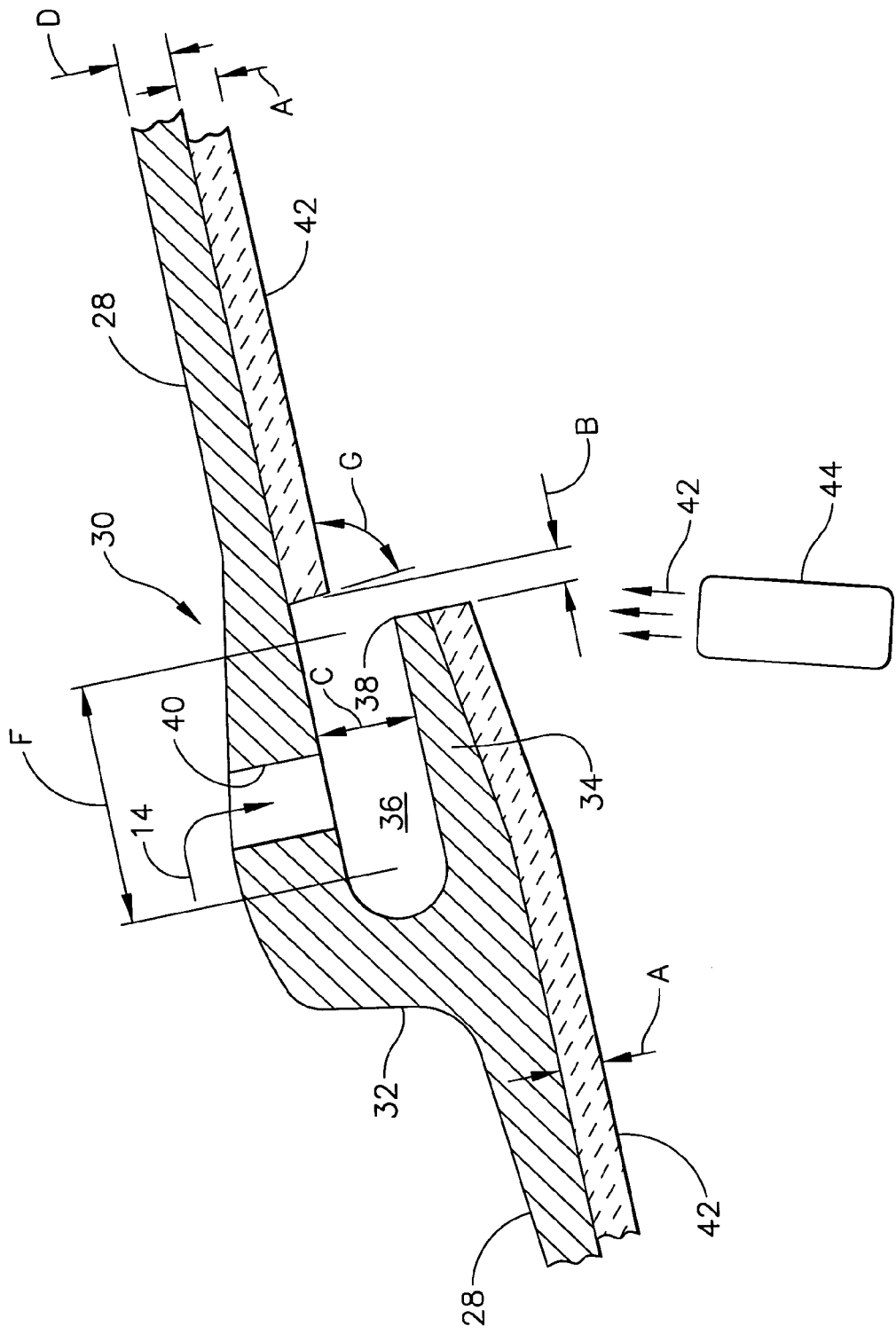
FIG. 4 is an axial sectional view of another cooling nugget in the liner of FIG. 2 in accordance with another embodiment.

FIGS. 3 and 4 illustrate in more detail two forms of the cooling nuggets 30 which may be used to integrally join together axially adjacent panels 28. Since the panels 28 are full rings, the corresponding cooling nuggets 30 themselves are also full rings, with both the bridge 32 and lip 34 extending circumferentially around the entire nugget, with the nugget outlet 38 being a full annulus at the aft end of the annular slot 36.

Each nugget as shown in FIG. 2 includes a row of aperture inlets 40 for receiving the cooling air 14 from the compressor which is then channeled through the corresponding nugget slots 36 for discharge from the annular outlet 38 in a continuous annular film of cooling air which then flows downstream along the inboard surfaces of the panels. The axial length of the individual panels 28 is selected for ensuring adequate strength of the cooling air film which is re-introduced or re-energized at each of the nuggets provided between the adjoining panels.

As shown in FIGS. 2–4, each of the panels 28 includes inboard surfaces facing the hot combustion gases which are covered with a thermal barrier coating 42 that has a nominal or uniform thickness A along the majority of the panels, along the corresponding lips 34, and aft of the slot outlets 38. The thermal barrier coating may have any conventional composition, and is typically ceramic material, such as yttria stabilized zirconia, sprayed from a conventional nozzle 44 in a conventional spray deposition process. The spray material is typically deposited in layers on the combustor liner until the suitable thickness is achieved.

As indicated above in the Background section, the covering of combustor liners, such as the outer and inner liners 24,26 illustrated in FIG. 1, with thermal barrier coating is conventional, with the coating typically being relatively thin. However, applying thicker thermal barrier coatings on the combustor liners can readily obstruct the function of the cooling nuggets, except as described hereinbelow in accordance with the two preferred embodiments illustrated in FIGS. 3 and 4.

In both embodiments, the corresponding lips 34 have distal ends at the slot outlets 38 which are spaced from the coating 42 aft of the slot at an axial or locally transverse spacing B therebetween which is less than about the nominal thickness A of the coating. For example, the thermal barrier coating 42 may be applied relatively thick, with a nominal thickness A of about 1.1 mm. The transverse spacing B between the nugget lip and downstream coating is less than about that nominal thickness, and may be about 0.8 mm for example.

In order to fully protect the combustor liners 24,26, the thermal barrier coating 42 should be applied over the inboard surfaces thereof at a relatively uniform thickness, notwithstanding the magnitude thereof. However, as the thickness of the thermal barrier coating increases, the configuration must be adjusted to prevent obstruction of the cooling nuggets, without compromising the insulating performance of the thermal barrier coating.

As the thickness A of the thermal barrier coating 42 increases, the transverse spacing B between the coating and the distal end of the nugget lip 34 must cooperate to prevent obstruction of the discharge flow from the cooling slot. The row of nugget or slot inlets 40 has a collective flow area which is preferably smaller than the flow area of the annular slot outlet 38 at the adjacent thermal barrier coating.

In this way, the slot inlets 40 are sized to meter or control the flowrate of the cooling air through the slots 36, with the slot outlet area being suitably larger, by about 10% for example, to ensure unobstructed discharge flow. The slot inlets 40 may therefore accurately meter the inlet flow through the slots, with the slot outlet and the transverse spacing B with the downstream thermal barrier coating being sufficiently large to ensure the proper cooling performance of the nugget.

Accordingly, the thermal barrier coating may be applied relatively thick at the desired nominal thickness A substantially uniformly over the entire inboard surfaces of the panels except inside the cooling nuggets themselves which are devoid of the thermal barrier coating, and with a suitable transition of the thermal barrier coating at the slot outlets.

The design of the engine and the design of the particular combustor configuration illustrated in FIG. 1 control the geometry of the outer and inner liners 24,26. Correspondingly, the geometry or configuration of the individual cooling nuggets 30 themselves is also controlled by the combustor design and is therefore fixed. The thermal barrier coating is applied after the combustor configuration is fixed and must therefore work in cooperation with the existing configuration of the cooling nuggets without adversely affecting the performance thereof, or adversely affecting the ability to thermally insulate the panels themselves at the junctions defined by the cooling nuggets in particular.

As illustrated in FIG. 3 for example, the nugget slot 36 has a fixed geometry including a radial or locally transverse height C at the slot outlet 38 which is typically uniform over the axial extent of the slot itself. Correspondingly, the thermal barrier coating has a thickness A which is relatively thick, and is about half the slot height C.

In an exemplary configuration, the slot height C is about 2.3 mm, and the coating thickness A is about 1.1 mm. The thickness of the coating A may range from about 40 percent to about 60 percent of the slot height C without unduly obstructing the discharge flow from the slot outlet, or degrading its insulating effect.

As shown in FIG. 3, the panels 28 are relatively thin and have substantially uniform thickness D aft of the locally enlarged cooling nuggets 30. An exemplary panel thickness D is about 1.27 mm, and the coating 42 may be as thick as about the panel thickness. Whereas conventional thermal barrier coatings are substantially thinner than the underlying substrate or panel, the thermal barrier coating 42 may be applied relatively thick and approaching the nominal thickness D of the panel themselves.

The particular embodiment of the overhang or lip 34 illustrated in FIG. 3 includes a decreasing taper to a thickness E at the slot outlet 38, and the thermal barrier coating 42 is thicker than the lip thickness E. In an exemplary embodiment, the lip thickness E is about 0.8 mm, and the thickness A of the coating is slightly larger.

The cooling nuggets slot 36 illustrated in FIG. 3 also has an axial length F that effects a length-to-height ratio with the height C of the slot which is about 2.8. This long aspect ratio for the cooling nuggets is again fixed by the geometry of the combustor for maximizing performance thereof, and the thermal barrier coating 42 is preferably thicker than the lip 34 covered thereby at the distal end thereof. And, the coating 42 is as thick as about half the slot height C as indicated above.

Accordingly, notwithstanding the preferred and fixed geometry of the cooling nuggets joining together the corresponding forward and aft panels 28, the thermal barrier coating 42 may be applied relatively thick upon the panels while ensuring an unobstructed slot outlet, with the distal end of the lip thereat being spaced from the downstream coating less than about the nominal thickness thereof.

It is noted that the two liners illustrated in FIG. 1 having similar configurations in axially adjoining panels, with commonly configured cooling nuggets. However, the cooling nuggets themselves have different orientations of the inlets 40 thereof in conventional configurations. For example, the cooling nugget inlets 40 may be axially oriented for benefits in starting the cooling air film, or may be radially oriented for providing enhanced impingement cooling of the overhanging lips themselves.

FIG. 3 illustrates in more detail the first cooling nugget illustrated at the upstream end of the liner shown in FIG. 2. The nugget inlets 40 extend axially through the bridge 32 with a slight inclination directed toward the facing surface of the lip. In this way, the cooling air 14 is directed axially through the bridge in a jet which glances off the lip in the axial downstream direction for discharge through the annular outlet 38. Correspondingly, the thermal barrier coating 42 commences or initiates on the next or aft panel with an inclined ramp at the leading edge thereof which increases in thickness to the nominal thickness of the coating.

The leading edge ramp of the thermal barrier coating 42 is shallow, and has an inclination angle G of about 45 degrees which may suitably vary smaller and larger relative thereto. If the ramp is too shallow, the thickness of the thermal barrier coating downstream from the cooling nugget will be below the nominal thick value A thereof, with a corresponding local loss in thermal protection. If the leading edge ramp is too blunt, undesirable stagnation of the cooling air discharged from the cooling slot can occur.

The shallow starting ramp of the thermal barrier coating aft of the cooling nugget preferably initiates directly adjacent to the slot outlet 38, and terminates at a spacing with the lip distal end less than about the coating nominal thickness A. In this way, the coating ramp begins immediately at the slot outlet, increases in thickness rapidly to the desired nominal thickness A of the thermal barrier coating, and all within a suitably short distance of the slot outlet to maximize thermal protection of the panel thereat due to the cooperation of the film cooling air being discharged through the slot and the introduction of the thermal barrier coating immediately downstream therefrom.

FIG. 4 illustrates an enlarged view of the second row cooling nuggets illustrated in FIG. 2. In this configuration, the nugget inlets 40 extend transversely or substantially normal through the forward end of the aft panel 28 defining the cooling nugget opposite to the cooperating lip 34 of the forward panel. In this configuration, the cooling air 14 is directed radially inwardly toward the opposite lip 34 for impingement cooling the inner surface thereof for enhanced heat transfer cooling.

Correspondingly, the thermal barrier coating 42 initiates or commences on the aft panel with a blunt step at the leading edge thereof. The blunt step has a corresponding inclination angle G which is preferably slightly less than about 90 degrees and may be down to about 85 degrees.

Whereas the shallow ramp in the FIG. 3 embodiment has an inclination angle G of about 45 degrees, the blunt step in the FIG. 4 embodiment has an almost normal inclination angle of about 85 degrees in the preferred embodiment. The shallow ramp in FIG. 3 cooperates with the axial inlet holes 40; whereas the blunt step in FIG. 4 cooperates with the transversely oriented inlet holes 40 which provide impingement cooling of the lip followed by lateral, or axial discharge of the spent impingement air downstream over the initiating thermal barrier coating.

In the FIG. 4 embodiment, the leading edge coating step is preferably spaced aft from the slot outlet 38 by a suitable axial or locally transverse spacing B. In particular, the leading edge step is preferably spaced from the distal end of the lip 34 less than about the nominal thickness A of the thermal barrier coating. For example, the spacing B may be about 0.8 mm which is slightly less than the 1.1 mm nominal thickness of the coating.

In this way, notwithstanding the blunt leading edge of the coating 42 at the slot outlet, the transverse spacing B between the distal end of the lip and the blunt leading edge of the coating may remain relatively small, and less than about the nominal thickness A of the coating, without obstructing the flow of the spent impingement air from the cooling nugget slot 36. The nugget inlets 40 retain their metering capability with their collective flow area being less than the outlet flow area between the lip and the blunt coating leading edge.

FIGS. 3 and 4 also illustrate schematically a preferred method of using the conventional spray nozzles 44 for air plasma spraying the thermal barrier coating material 42 over the inboard surfaces of the combustor liner panels. In FIG. 3, the nozzle 44 is suitably oriented for using the nugget lip 34 itself as a mask to shadow and protect the inside surfaces of the nugget slot 36 against accumulation of thermal barrier coating therein. Correspondingly, the shadow protection of the lip itself permits building of the shallow leading edge ramp of the thermal barrier coating at the slot outlet.

In FIG. 4, the nozzle 44 may be oriented more perpendicular to the nugget lip 34 for forming the blunt leading edge step of the thermal barrier coating initiating slightly aft of the lip distal end.

In both configurations illustrated in FIGS. 3 and 4, the spray nozzle 44 is suitably translated axially for building the thermal barrier coating in layers over the entire inboard surfaces of the liner panels to achieve the desired relatively uniform and thick coating thereon.

As illustrated in FIG. 1, the annular panels 28 of each outer and inner combustor liner 24,26 are joined together axially in turn at the corresponding annular cooling nuggets 30. One of the cooling nuggets 30 as illustrated in FIG. 3 may include the axial inlets 40 through the bridge 32 for discharging the cooling air axially through the slot outlet, and in turn over the shallow leading edge ramp which initiates the thermal barrier coating 42 adjacent the slot outlet 38.

Another one of the cooling nuggets 30 may include the transverse or normal inlets 40 as illustrated in FIG. 4 aft of the bridge 32 and opposite to the lip 34. In this configuration, the normal inlets 40 direct the cooling air in impingement against the lip 32, and the spent impingement air is discharged axially from the slot outlet over the blunt leading edge step which initiates the thermal barrier coating 42 aft of the slot outlet 38.

The two configurations illustrated in FIGS. 3 and 4 provide enhanced cooperation between the particular configuration of the cooling nugget and the thickly applied thermal barrier coating. The coatings in the two configurations may have the same nominally thick value, but initiate differently at the slot outlets depending upon the orientation of the nugget inlets 40 either axially through the bridge 32 or transversely through the panel in opposition to the overhanging lip.

The thermal barrier coating is positioned closely adjacent to the respective cooling nuggets for maintaining enhanced thermal protection from the thicker coating without obstructing proper flow performance of the cooling nuggets themselves. In both configurations, the nugget inlets 40 effect metering of the inlet flow through the nuggets without compromise by the thick thermal barrier coating downstream therefrom.

The specifically configured leading edge of the thermal barrier coating aft of the slot outlets reduces or eliminates flow stagnation of the cooling air being discharged from the nuggets for establishing effective film cooling downstream over the thermal barrier coatings themselves. And, in the immediate transition between the cooling nuggets and the commencement of the thermal barrier coating in the downstream panel, the brief lapse in full thickness thermal barrier coating does not degrade the cooling effectiveness of the liner.

It is noted that the cooling performance of the combustor liners is no better than the minimum cooling performance at any particular location thereof. The two configurations of the transition in otherwise uniform thermal barrier coating at the slot outlets illustrated in FIGS. 3 and 4 maintain adequate thermal protection of the liner commensurate with the thicker applied thermal barrier coating.

Accordingly, the entire outer combustor liner, as well as the inner combustor liner, so configured with the increased thickness thermal barrier coating cooperating with the corresponding cooling nuggets enjoys enhanced thermal protection therefrom which permits a corresponding increase in the temperature of the combustion gases for increasing efficiency of operation and reducing NOx emissions; or the reduction of film cooling air for otherwise equal performance.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which 1. A combustor liner comprising:
    forward and aft panels joined together at a cooling nugget including an integral bridge having a lip extending aft from said forward panel and spaced from said aft panel to define a slot terminating in an outlet;
    a thermal barrier coating covering inboard surfaces of said panels and lip with a nominal thickness, and having a leading edge inclined at an acute angle aft of said slot outlet; and
    said lip having a distal end at said slot outlet being spaced from said coating aft of said slot less than about said coating nominal thickness.

2. A liner according to claim 1 wherein said slot has a height at said slot outlet, and said coating is as thick as about half said slot height.

3. A liner according to claim 2 wherein said lip has a thickness at said slot outlet, and said coating is thicker than said lip thickness.

4. A liner according to claim 3 wherein:
    said cooling nugget includes a row of aperture inlets disposed in flow communication with said slot for channeling cooling air therethrough; and
    said nugget inlets have a smaller collective flow area relative to said slot outlet at said coating.

5. A liner according to claim 4 wherein:
    said aft panel has a thickness aft of said nugget, and said coating is as thick as about said panel thickness; and
    said slot has an axial length-to-height ratio of about 2.8, and said coating is thicker than said lip, and as thick as about half said slot height aft of said slot outlet.

6. A liner according to claim 5 wherein said nugget inlets extend axially through said bridge, and said coating initiates at said leading edge on said aft panel with a shallow ramp.

7. A liner according to claim 6 wherein said coating ramp initiates adjacent said slot outlet, is inclined at a shallow angle of about 45 degrees, and terminates at a spacing aft from said lip distal end.

8. A liner according to claim 5 wherein said nugget inlets extend transversely through said aft panel opposite to said lip of said forward panel, and said coating initiates at said leading edge on said aft panel with a blunt step being less than 90 degrees and down to about 85 degrees.

9. A liner according to claim 8 wherein said coating step is spaced aft from said slot outlet, and is spaced from said lip distal end less than about said coating nominal thickness.

10. A liner according to claim 5 further comprising:
multiple annular panels joined together in turn at corresponding annular cooling nuggets;
one cooling nugget including axial inlets through said bridge for discharging said cooling air from said slot outlet over a shallow ramp initiating said thermal barrier coating adjacent said slot outlet; and
another cooling nugget including transverse inlets aft of said bridge opposite to said lip for impinging said cooling air against said lip for discharge from said slot outlet over a blunt step initiating said thermal barrier coating aft of said slot outlets.

11. A combustor liner comprising:
a plurality of panels axially joined together at an integral cooling nugget;
said nugget including a bridge joining a downstream end of a forward panel to an upstream end of an adjacent aft panel, and a lip extending from said forward panel at said bridge and spaced from said aft panel to define a slot therebetween having an outlet;
said nugget further including a row of aperture inlets for receiving cooling air for discharge through said slot outlet;
said panels including inboard surfaces covered with a thermal barrier coating having a nominal thickness along said lip and aft of said slot outlet, and said coating has a leading edge inclined at an acute angle aft of said slot outlet; and
said lip having a distal end at said slot outlet being spaced from said coating aft of said slot less than about said coating nominal thickness.

12. A liner accordingly to claim 11 wherein said nugget inlets have a smaller collective flow area relative to said slot outlet at said coating.

13. A liner accordingly to claim 12 wherein said slot has a height at said slot outlet, and said coating thickness is less than said slot height.

14. A liner accordingly to claim 12 wherein said aft panel has a thickness aft of said nugget, and said coating is as thick as about said panel thickness.

15. A liner accordingly to claim 12 wherein said lip has a thickness at said slot outlet, and said coating is thicker than said lip thickness.

16. A liner accordingly to claim 12 wherein said slot has an axial length-to-height ratio of about 2.8, and said coating is thicker than said lip, and as thick as about half said slot height aft of said slot outlet.

17. A liner accordingly to claim 12 wherein said nugget inlets extend axially through said bridge, and said coating initiates at said leading edge on said aft panel with a ramp.

18. A liner according to claim 17 wherein said coating ramp is shallow.

19. A liner according to claim 17 wherein said coating ramp initiates adjacent said slot outlet, and terminates at a spacing aft from said lip distal end.

20. A liner accordingly to claim 12 wherein said nugget inlets extend transversely through said aft panel opposite to said lip of said forward panel, and said coating initiates at said leading edge on said aft panel with a blunt step.

21. A liner accordingly to claim 20 wherein said coating step is spaced aft from said slot outlet.

22. A liner accordingly to claim 21 wherein said coating step is spaced from said lip distal end less than about said coating nominal thickness.

* * * * *